US009549243B2

(12) United States Patent
Stys et al.

(10) Patent No.: US 9,549,243 B2
(45) Date of Patent: Jan. 17, 2017

(54) SPLIT BOX SUBWOOFER WITH BODY MOUNTED DRIVER

(71) Applicant: GM Global Technology Operations LLC, Detroit, MI (US)

(72) Inventors: Gregory A. Stys, South Lyon, MI (US); Richard A. Close, Farmington Hills, MI (US); Dale E. Osentoski, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 14/566,875

(22) Filed: Dec. 11, 2014

(65) Prior Publication Data

US 2016/0173974 A1 Jun. 16, 2016

(51) Int. Cl.
*H04B 1/00* (2006.01)
*H04R 1/28* (2006.01)
*H04R 1/02* (2006.01)

(52) U.S. Cl.
CPC .............. *H04R 1/2884* (2013.01); *H04R 1/02* (2013.01); *H04R 2499/13* (2013.01)

(58) Field of Classification Search
CPC ..... H04R 2499/13; H04R 5/02; H04R 1/2884; H04R 1/02
USPC ............................................................ 381/86
See application file for complete search history.

(56) References Cited

U.S. PATENT DOCUMENTS 6,226,927 B1 * 5/2001 Bertolini ............. B60R 11/0217 181/150
7,130,440 B2 * 10/2006 Maekawa ................ B60N 2/68 381/365
7,457,425 B2 * 11/2008 Fincham ................. H04S 1/002 381/300
2004/0141625 A1 * 7/2004 Leipold ............... B60R 11/0217 381/86
2006/0239495 A1 * 10/2006 Abe ....................... H04R 1/025 381/386
2007/0127760 A1 * 6/2007 Saiki .................... H04R 1/2803 381/351
2010/0091997 A1 * 4/2010 Tiwari .................... B60R 11/02 381/1
2010/0092006 A1 * 4/2010 Rosen .................. H04R 1/2834 381/86

(Continued)

FOREIGN PATENT DOCUMENTS

DE 102005046594 B3 3/2007
EP 1407934 A1 4/2004

(Continued)

OTHER PUBLICATIONS

German Office Action dated Sep. 20, 2016; Application No. 10 2015 120 366.9; Applicant: GM Global Technology Operations LLC. ; 6 pages.

*Primary Examiner* — Simon King
(74) *Attorney, Agent, or Firm* — BrooksGroup

(57) ABSTRACT

A product is disclosed that may be used in a vehicle and may include a subwoofer speaker driver mounted in an enclosure which is attached to the vehicle's body. A volume of space may define an acoustic chamber in a closure of the vehicle. A duct may be provided between the enclosure and the acoustic chamber. The size of the enclosure may be minimized by using available space in the closure to serve as part of the bass chamber volume for the subwoofer.

10 Claims, 3 Drawing Sheets

(56) References Cited

U.S. PATENT DOCUMENTS

| | | | | |
|---|---|---|---|---|
| 2012/0250929 | A1* | 10/2012 | Subat .................. | H04R 1/2803<br>381/389 |
| 2014/0219492 | A1* | 8/2014 | Pelliccio ............. | B60N 2/0232<br>381/389 |

FOREIGN PATENT DOCUMENTS

| | | | |
|---|---|---|---|
| JP | S59081187 | U | 6/1984 |
| JP | S6341989 | U | 3/1988 |
| JP | 3926833 | B1 | 6/2007 |

* cited by examiner

SPLIT BOX SUBWOOFER WITH BODY MOUNTED DRIVER

TECHNICAL FIELD

The field to which the disclosure generally relates includes subwoofers for audio systems.

BACKGROUND

Subwoofers provide a low frequency bass sound from an audio system. Subwoofers may be constructed with one or more speakers mounted in a rigid enclosure. The enclosure may be sealed or ported. Subwoofers may require a relatively large enclosure to optimize performance. When space is limited such as in a vehicle, the amount of space needed for subwoofers may pose challenges.

SUMMARY OF ILLUSTRATIVE VARIATIONS

A product which may be used in a vehicle may include a subwoofer speaker driver mounted in an enclosure which is attached to the vehicle's body. A volume of space may define an acoustic chamber in a closure of the vehicle. A duct may be provided between the enclosure and the acoustic chamber. The size of the enclosure may be minimized by using available space in the closure to serve as part of the bass chamber volume for the subwoofer.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
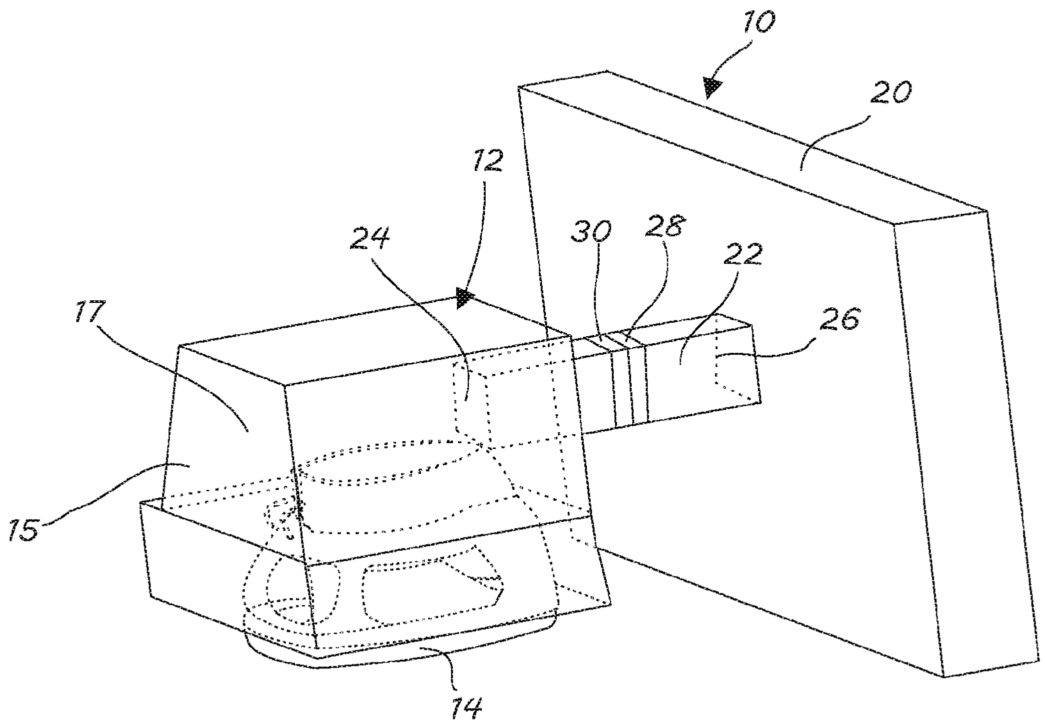
FIG. 1 is a schematic illustration of a split box subwoofer arrangement according to a number of variations.

According to a number of variations a product 10 may include a split-box subwoofer assembly 12 as shown in FIG. 1. A subwoofer may be a speaker driver designed to produce low frequency bass sounds as part of an audio system and may be mounted in a vehicle as part of a sound delivery system for various media. The speaker driver, which may be referred to as a driver or a speaker, may be a transducer that converts an electrical signal to sound waves. The split-box subwoofer assembly 12 may have a driver 14 mounted in an enclosure 15, which in turn may be attached to the body of vehicle. The enclosure 15 may contain approximately five liters of volume which may house the driver 14 and provide a minimal amount of open space in a rear chamber 17 to serve as part of the bass volume for the split-box subwoofer assembly 12. A separate acoustic chamber 20 may be provided in a closure of the vehicle. Acoustic chamber 20 may include 8 to 11 liters of volume, or a different amount as needed. The closure may take the form of a door, gate or hatch, or another structure that closes an opening of the vehicle. The enclosure 15 may be sealed or ported depending on the application's requirements.

A duct 22 may extend between an opening 24 in the enclosure 15 and an opening 26 in the acoustic volume 20, joining the two so that a single bass volume is made up of the enclosure 15, duct 22 and acoustic chamber 20. The duct 22 may be separable at a joint 28 that may include a seal 30 to seal the duct at the joint. Optionally, the duct may be omitted where the enclosure 15 may be mounted adjacent the acoustic volume 20. In such a case, the seal 30 would seal the adjacent openings 24 and 26 directly. Through this construction, the volume needed for the enclosure 15 may be minimized, extending the options for locating the driver 14 in a vehicle by using available space for the acoustic chamber 20.

Figure 2:
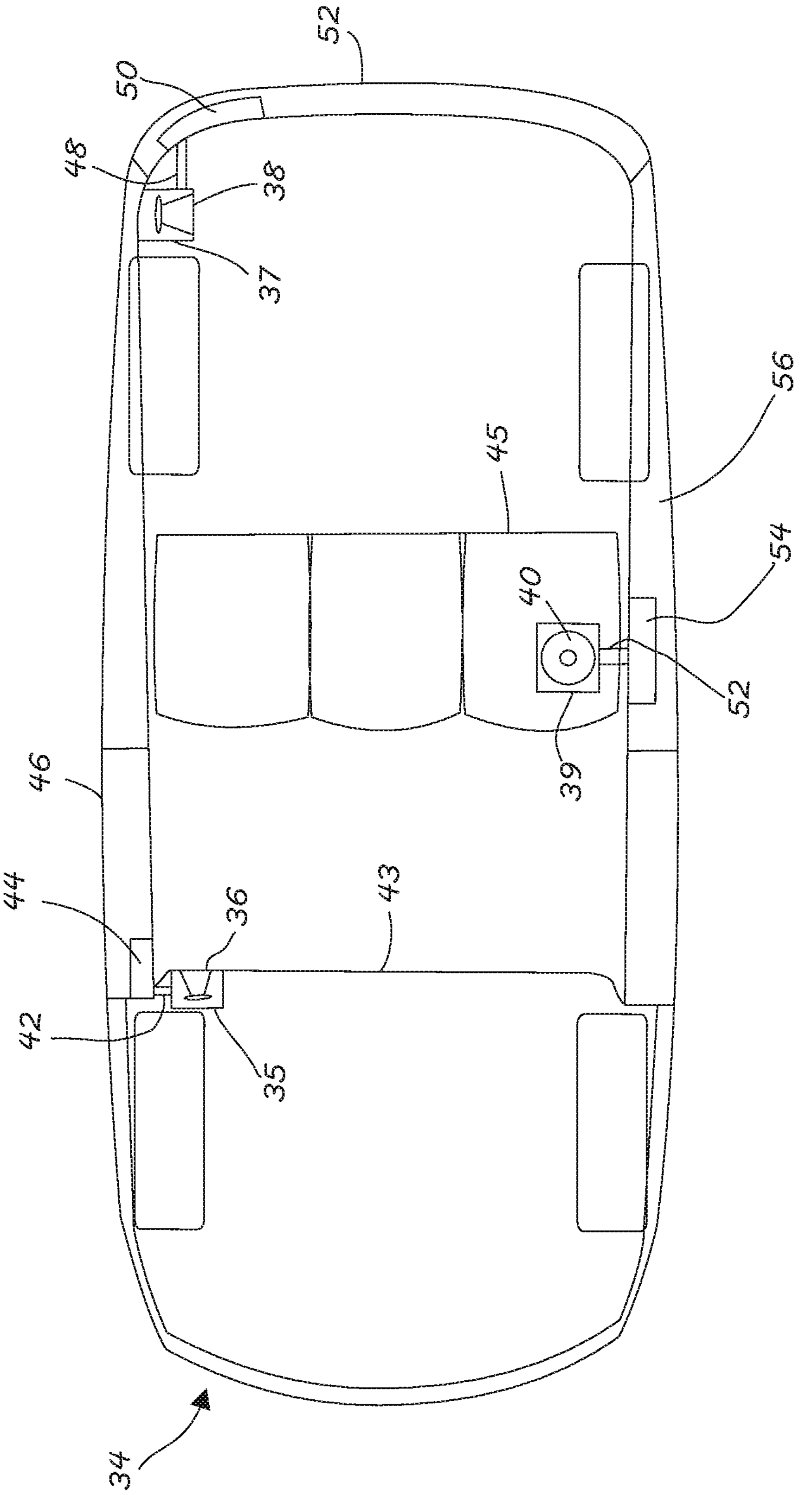
FIG. 2 is a schematic illustration of a vehicle showing locations of a split box subwoofer arrangement according to a number of variations.

Referring to FIG. 2, an enclosure and driver may be mounted at various positions in a vehicle 34. For example, an enclosure 35 with a driver 36 may be mounted under the dash 43 of the vehicle 34 with a duct 42 connecting the enclosure 35 to an acoustic chamber 44 in the front door 46. Also, an enclosure 37 with a driver 38 may be mounted near the rear of the vehicle 34 with a duct 48 connecting the enclosure 37 with an acoustic chamber 50 in the rear gate 52. Also, an enclosure 39 with a driver 40 may be mounted under a seat 45 of the vehicle 34 with a duct 52 connecting enclosure 39 with an acoustic chamber 54 in a door or panel 56. The face of the drivers may be covered by a grill or positioned behind a panel with a grill opening.

Figure 4:
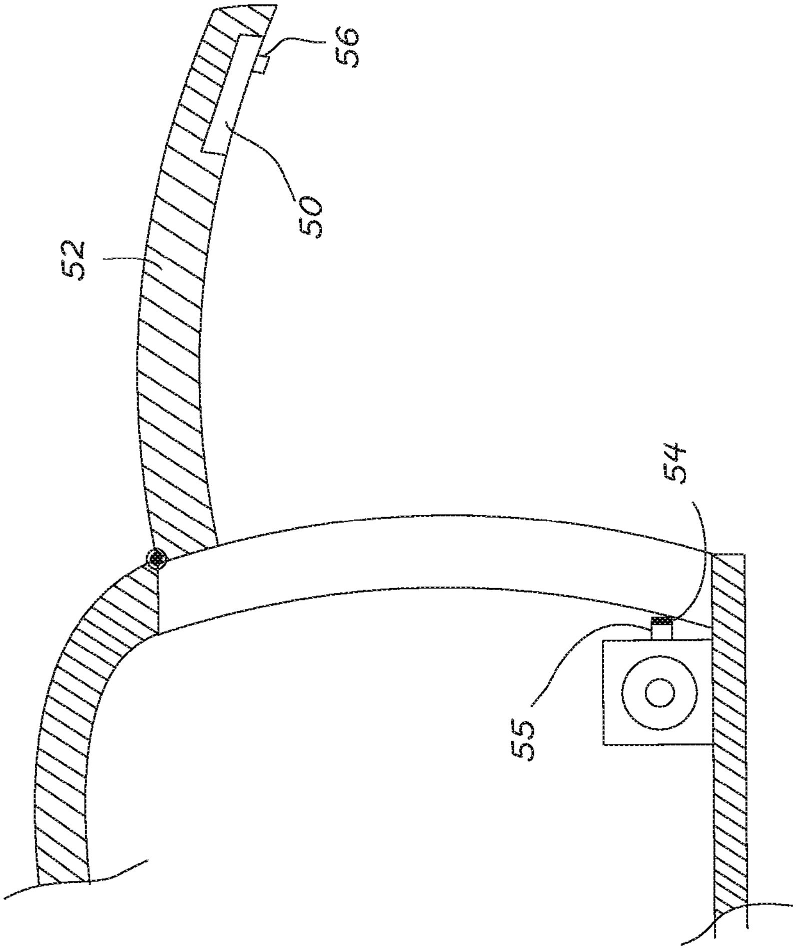
FIG. 4 is a side view schematic illustration of the split box subwoofer arrangement of FIG. 3 with the closure opened.
Figure 3:
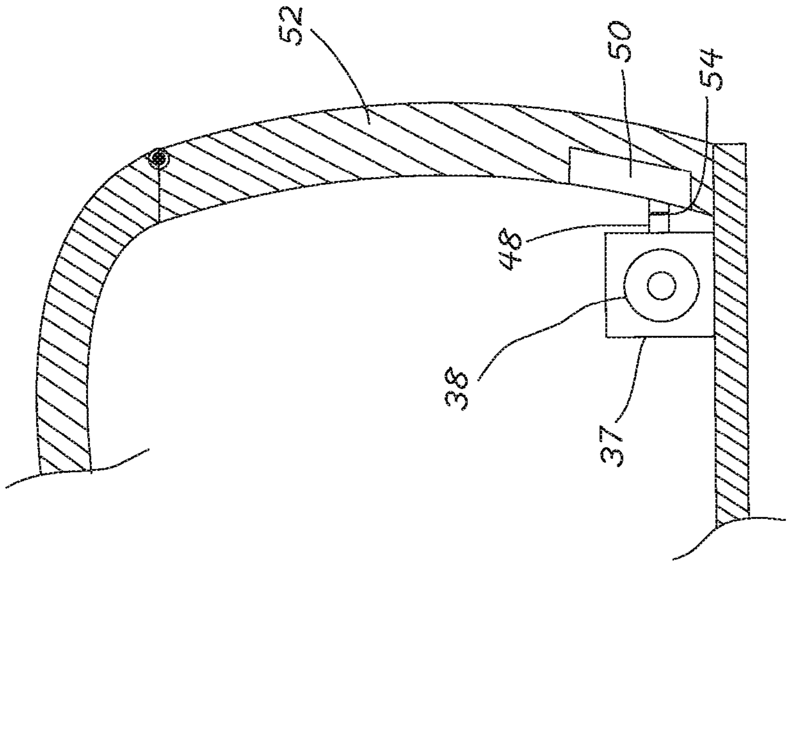
FIG. 3 is a side view schematic illustration of a split box subwoofer arrangement according to a number of variations.

Referring to FIG. 3, an enclosure 37 with a driver 38 may be positioned near a liftgate 52. A duct 48 may connect the enclosure 37 with an acoustic chamber 50 in the liftgate 52 at the rear of the vehicle. When the liftgate 52 is closed, the seal 54 seals the joint in the duct 48 and a combined bass chamber is defined by the volume in the enclosure 37 behind the driver 38, the duct 48 and the acoustic chamber 50. When the liftgate 52 is opened as shown in FIG. 4, the duct 48 may separate at the seal 54, and the acoustic chamber 50 will be raised with the opening closure. When the closure is closed, the duct section 56 may rejoin the duct section 55 at seal 54. Alternately, the connection between the enclosure and the acoustic chamber may be provided near a hinged side of the closure (such as shown by enclosure 35 in FIG. 2), with a flexible duct 42 section providing an uninterrupted connection between the enclosure 35 and the acoustic chamber 44 when the closure 46 is opened.

The following description of variants is only illustrative of components, elements, acts, products and methods considered to be within the scope of the invention and is not in any way intended to limit such scope by what is specifically disclosed or not expressly set forth. Components, elements, acts, products and methods may be combined and rearranged other than as expressly described herein and still are considered to be within the scope of the invention.

Variation 1 may include a product for use in a vehicle. The vehicle may have a body with a closure for closing an opening in the body. The product may include a speaker driver mounted in an enclosure with a space in the enclosure behind the speaker driver. An acoustic chamber may be defined in the closure. The enclosure may include a first opening into the space and the closure may include a second opening into the acoustic chamber. The first and second openings may be connected so that the speaker driver has a combined bass volume made up of the space and the acoustic chamber.

Variation 2 may include a product according to variation 1 with a duct extending between the first opening into the enclosure and the second opening into the acoustic chamber and opening the space to the acoustic chamber.

Variation 3 may include a product according to variation 1 or 2 wherein the enclosure is located under a seat in the body.

Variation 4 may include a product according to any of variations 1-3, wherein the acoustic chamber is located inside a rear gate of the vehicle.

Variation 5 may include a product according to any of variations 1-4, wherein the acoustic chamber is larger in volume than the space.

Variation 6 may include a product according to any of variations 1-5 wherein the speaker driver is located near an instrument panel of the vehicle.

Variation 7 may include a product according to variation 2 wherein the duct is flexible.

Variation 8 may include a product according to variation 2 wherein the duct separates at a joint when the closure is opened.

Variation 9 may include a product for use in a vehicle with a body. An enclosure may be mounted to the body. A speaker driver may be mounted in the enclosure and may define a rear chamber behind the speaker driver in the enclosure. An acoustic chamber may be defined in the body. A sealed connection may open the rear chamber to the acoustic chamber so that the speaker driver has a combined bass volume formed by the rear chamber and the acoustic chamber.

Variation 10 may include a product according to variation 9, wherein the acoustic chamber is located in a door of the body.

Variation 11 may include a product for according to variation 9 or 10 wherein the enclosure is located under a seat in the interior of the body.

Variation 12 may include a product according to any of variations 9 through 11 wherein the acoustic chamber is located inside a rear gate of the vehicle.

Variation 13 may include a product according to any of variations 9 through 12, wherein the speaker driver is located forward of an instrument panel of the vehicle.

Variation 14 may include a product according to any of variations 9 through 13, wherein a duct extends between the enclosure and the closure, connecting the rear chamber to the acoustic chamber.

Variation 15 may include a vehicle media system wherein the vehicle includes a body having an interior, an opening to the interior, and a closure for the opening. The vehicle media system may include an enclosure mounted to the body. A speaker driver may be mounted in the enclosure so that the speaker is directed into the interior. The speaker driver may define a rear chamber in the enclosure. An acoustic chamber may be defined in the closure. A sealed duct having a duct volume may extending across a part of the vehicle and may be open at a first end to the rear chamber and may be open at a second end to the acoustic chamber. The rear chamber, the duct volume, and the acoustic chamber, may form a combined bass chamber for the speaker driver.

The above description of select variations within the scope of the invention is merely illustrative in nature and, thus, variations or variants thereof are not to be regarded as a departure from the spirit and scope of the invention.

What is claimed is:

1. A product for use in a vehicle comprising: a body defining an interior of the vehicle, a closure, the body defining a body opening through which the interior may be accessed when the closure is opened, a speaker driver mounted in an enclosure with a space in the enclosure behind the speaker driver, the enclosure disposed in the interior, wherein the enclosure is located under a seat in the body, and an acoustic chamber defined in the closure, wherein the enclosure includes a first opening into the space and the closure includes a second opening into the acoustic chamber, wherein the first and second openings are connected so that the speaker driver has a combined bass volume made up of the space and the acoustic chamber.

2. The product according to claim 1 further comprising a duct extending between the first opening into the enclosure and the second opening into the acoustic chamber, the duct connecting the space to the acoustic chamber, wherein the space and the acoustic chamber are separated except for their connection through the duct.

3. The product according to claim 1 wherein the acoustic chamber is larger in volume than the space.

4. A vehicle media system wherein the vehicle includes a body having an interior, with an opening to the interior, and a closure for the opening, the vehicle media system comprising: an enclosure mounted to the body; a speaker driver mounted in the enclosure so that the speaker is directed into the interior, with the speaker driver defining a rear chamber in the enclosure; an acoustic chamber defined in the closure; and a sealed duct having a duct volume and extending across a part of the vehicle and being open at a first end to the rear chamber and being open at a second end to the acoustic chamber; wherein the rear chamber, the duct volume and the acoustic chamber form a combined bass chamber for the speaker driver.

5. The vehicle media system according to claim 4 wherein the duct is flexible.

6. The vehicle media system according to claim 4 wherein the duct separates at a joint, and the duct is separated and opened when the closure is opened.

7. The vehicle media system according to claim 4 wherein the enclosure is located under a seat in the interior of the body.

8. The vehicle media system according to claim 4 wherein the acoustic chamber is located inside a rear gate of the vehicle.

9. The vehicle media system according to claim 4 wherein the speaker driver is located forward of an instrument panel of the vehicle.

10. The vehicle media system according to claim 4 wherein the acoustic chamber moves relative to the body and with the closure when the closure is opened or closed, and the enclosure remains stationary relative to the body when the closure is opened or closed.

* * * * *